United States Patent [19]

Hara et al.

[11] 4,266,251

[45] May 5, 1981

[54] FACSIMILE TRANSMISSION AND RECEPTION APPARATUS

[75] Inventors: Kazuyuki Hara, Yokohama; Takeshi Kamada, Atsugi, both of Japan

[73] Assignee: Ricoh Company, Ltd., Japan

[21] Appl. No.: 13,412

[22] Filed: Feb. 21, 1979

[30] Foreign Application Priority Data

Feb. 23, 1978 [JP] Japan .................................. 53-20334

[51] Int. Cl.³ .............................................. H04N 1/12
[52] U.S. Cl. .................................. 358/286; 358/285; 358/293; 358/294
[58] Field of Search ................ 358/286, 293, 296, 285

[56] References Cited

U.S. PATENT DOCUMENTS

| | | | |
|---|---|---|---|
| 1,751,584 | 3/1930 | Hansell | 358/294 |
| 3,064,077 | 11/1962 | Cary | 358/286 |
| 3,469,027 | 9/1969 | Reese | 358/286 |
| 3,610,824 | 10/1971 | Hansen | 358/286 |
| 3,818,126 | 6/1974 | Fomenko | 358/286 |
| 3,845,239 | 10/1974 | Granzow | 358/286 |
| 4,080,634 | 3/1978 | Schreiber | 358/286 |
| 4,087,838 | 5/1978 | Masaki | 358/286 |
| 4,148,076 | 3/1979 | Costello | 358/285 |
| 4,149,196 | 4/1979 | Wada | 358/293 |

*Primary Examiner*—Howard W. Britton
*Attorney, Agent, or Firm*—McGlew and Tuttle

[57] ABSTRACT

The facsimile transmission and reception apparatus comprises transportation means for originals and a recording paper transporation means, which are for transporting and positioning the original document and the recording paper substantially in the same width range normal to the movement direction of the original document and the recording paper, and the original document inserted, with an image information bearing side up, is transported substantially vertically from an upper position to a lower position.

14 Claims, 12 Drawing Figures

FACSIMILE TRANSMISSION AND RECEPTION APPARATUS

BACKGROUND OF THE INVENTION

The present invention relates to a facsimile transmission and reception apparatus.

As is well known in the facsimile apparatus, image information read at a transmission site is converted into electric signals, which are then transmitted to a remote place, and the image information is reproduced faithfully at a reception site. Recently, facsimile apparatus has become widely used in the field of information transmission apparatus. In the facsimile transmission and reception apparatus provided with both a read head and a recording head, one unit comprising both transmission and reception apparatus can perform both transmission and reception. Therefore, when such apparatus is used in practice, one unit is used at the transmission site and one unit is used at the reception site. At the transmission site, read scanning is performed by use of only the read head, while recording scanning is performed by use of only the recording head.

With respect to the above-mentioned apparatus, it is desired to make the apparatus smaller in size and lower in price. Furthermore, improvement of operation and maintenance of the apparatus is also desired. However, in the conventional facsimile transmission and reception apparatus, the design is such that a transmission unit provided with the read head and other devices, and a reception unit provided with a recording head and other devices, are separately disposed horizontally or vertically. Accordingly, in each unit, there are disposed the driving system of each head and a transfer driving system for original documents and for the recording sheets. As a result, the body of the apparatus is comparatively large and accordingly, it is difficult to reduce the cost of the apparatus.

On the other hand, it is important that the maintenance of the apparatus and the operation of original document transporation system and attachment and detachment of the recording sheets be improved in addition to making the apparatus smaller in size and lower in price. For example, more specifically with respect to the original document transporation system, in the case where many and various types of information are handled in the facsimile apparatus, and image information is successively transmitted with many original document inserted individually into the apparatus, it is convenient that the discharged original documents be stacked in the order of pages after the read scanning. At the same time, when a system of inserting original documents with the image information bearing surface up is adopted and multiple original documents are inserted successively, the order of pages can be conveniently confirmed.

SUMMARY OF THE INVENTION

For the foregoing reasons, a principal object of the present invention is to provide a facsimile transmission and reception apparatus without the above-mentioned problems of the conventional facsimile apparatus.

According to the present invention, an original transporation means and a recording paper transporation means are provided for transporting and positioning the original document and the recording paper substantially in the same width range normal to the movement direction of the original document and the recording paper, and the original document inserted, with an image information bearing side up, from an original insertion inlet, is transported substantially vertically from an upper position to a lower position.

Furthermore, according to the present invention, when multiple original documents are successively transmitted, the original documents are stacked on an original discharge tray, with the image information bearing side of each original document down, in the order of transmission, and the original documents are inserted with the respective image information bearing sides up, so that the order of pages of the original documents to be transmitted can be easily checked.

Furthermore, in the present invention, since the recording paper is maintained horizontally between a pair of main feed rollers and a curl correction roller, the recording paper can be brought into close contact with the read head by the weight of the recording paper itself. And in the present invention, the read head and the record head are positioned within the same range as the image information range of the original, so that both the heads can be carried by a common carrier and the driving system for main scanning can be constructed in one unit, whereby reduction of the size of the apparatus can be attained and accordingly the cost of the apparatus can be lowered.

BRIEF DESCRIPTION OF THE DRAWINGS

For a better understanding of the invention as well as the objects and other features, reference will be had to the following detailed description which is to be read in conjunction with the drawings wherein:

FIG. 11 is a plan, partly in cross-section, of the apparatus of FIG. 10.

FIG. 12 is a schematic sectional view of an example of original transportation guide plate, one of which can be opened and closed.

DETAILED DESCRIPTION OF THE PREFERRED EMBODIMENTS

Figure 1:
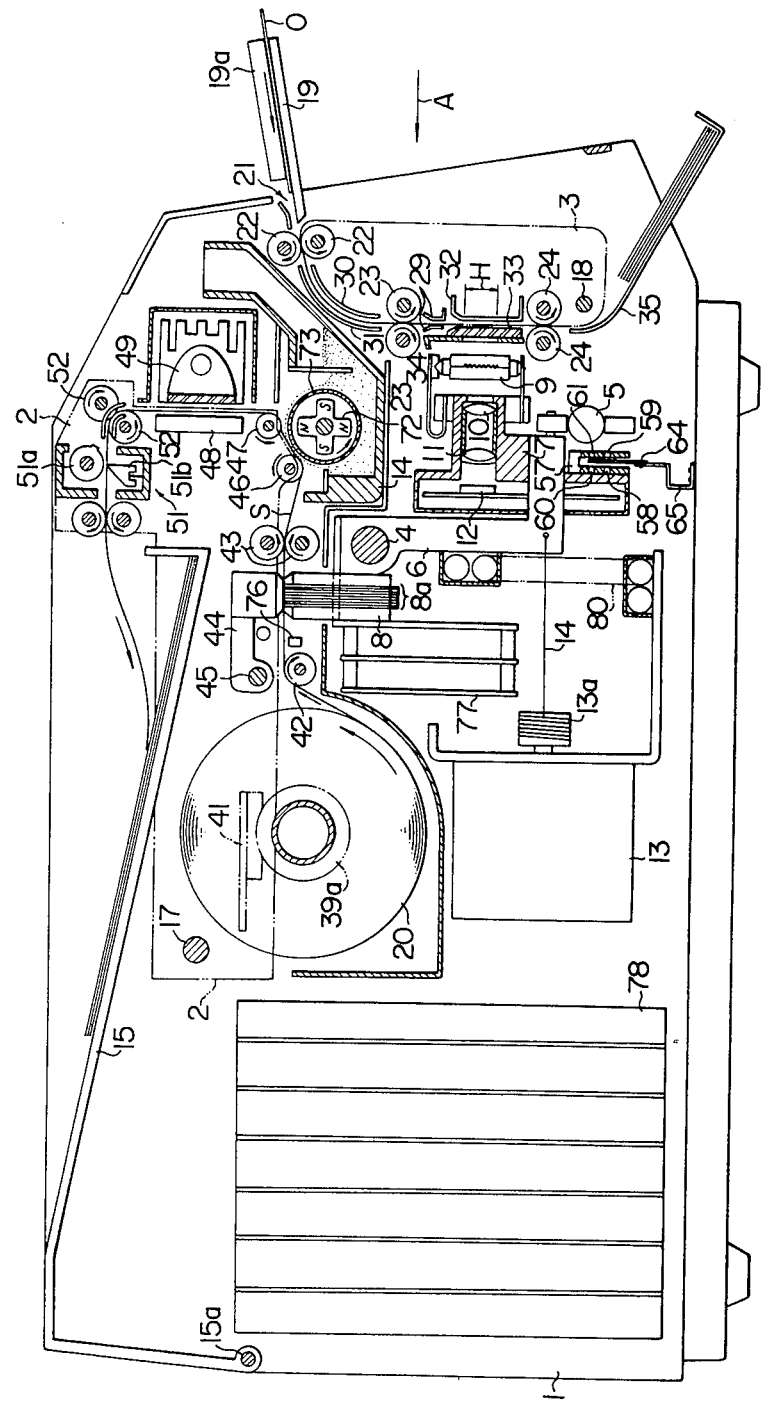
FIG. 1 is a schematic sectional side view of an embodiment of a facsimile transmission and reception apparatus according to the present invention.

Referring to FIG. 1, there is shown one embodiment of a facsimile transmission and reception apparatus according to the present invention. This apparatus mainly comprises a main scanning apparatus system, an original document transporation apparatus system and a recording sheet transporation apparatus system in addition to a development apparatus, an image fixing apparatus and a recording sheet cutting apparatus. Each of the above-mentioned systems will now be explained.

(1) Main Scanning Apparatus System

Figure 2:
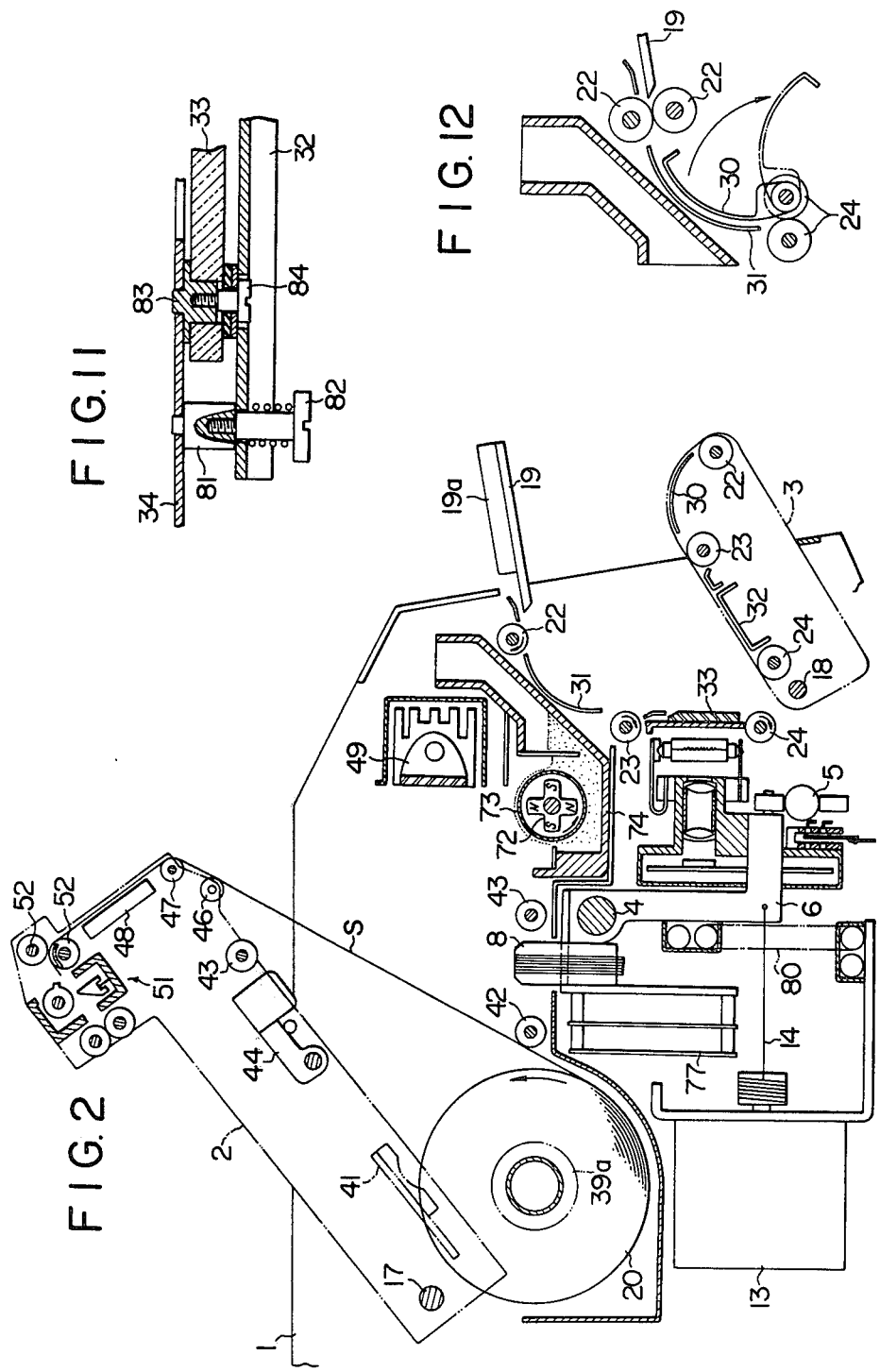
FIG. 2 is a schematic sectional side view of the embodiment of FIG. 1, in which an upper housing and a unit body are respectively opened.
Figure 3:
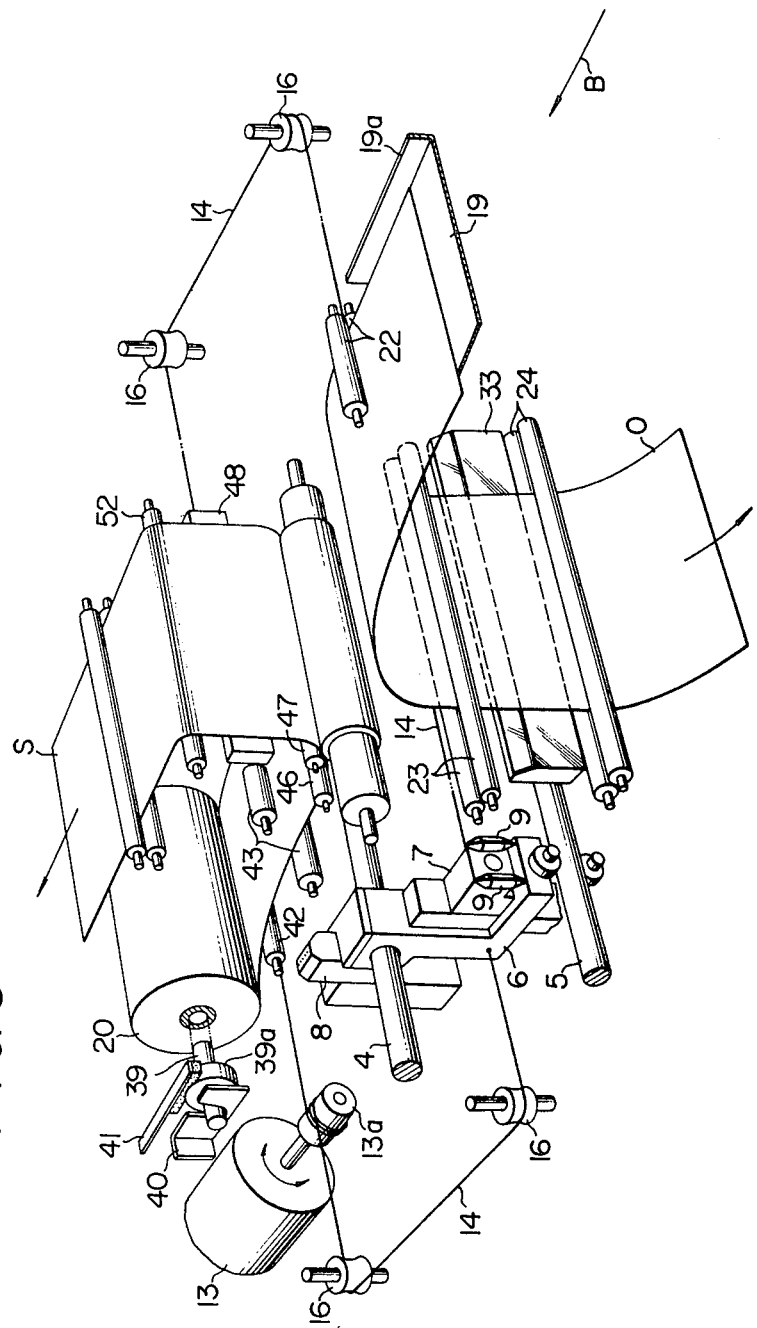
FIG. 3 is a schematic perspective view of the main portions of the embodiment of FIG. 1.

Referring to FIG. 1 to FIG. 3, to a carrier 6 supported by parallel guide shafts 4 and 5, there are fixed the read head 7 and a recording head 8. At a front end portion of the read head 7, there is disposed an original document illumination lamp 9, and inside the read head 7, there are disposed image information lenses 10 and 11 and a solid sensor 12 (which will be described in detail later). The recording head 8 is disposed in the direction normal to the optical axis of the image information lenses 10 and 11. Around a drive pulley 13a of a servomotor 13, for example, which drives the carrier 6, there is wound a wire 14 which is trained over pulleys 16 disposed in the positions as shown in FIG. 3, and one end of the wire 14 and the other end of the wire 14 are connected to the carrier 6, respectively. The carrier 6 is moved forwards and backwards together with the heads 7 and 8 within a predetermined stroke along the guide shafts 4 and 5 by the normal and reverse rotations of the servomotor 13 through the wire 14.

(2) Original Document Transporation Apparatus System

Figure 6:
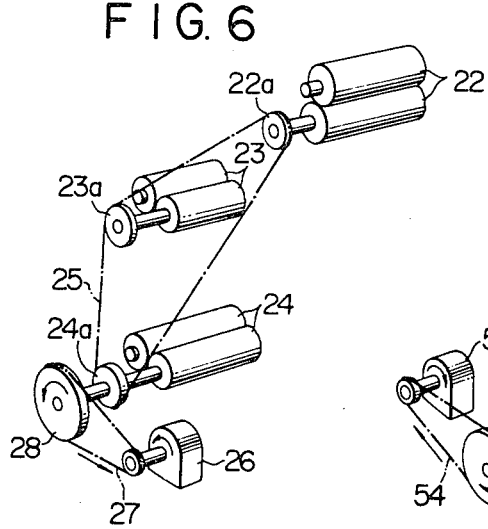
FIG. 6 is a schematic perspective view of one example of an original document transportation drive mechanism.

Referring to FIG. 1, in operating the present apparatus in practice, an operation button (not shown) is depressed on the right side of the apparatus and, at the same time, the original document is inserted in the direction of the arrow A. Here, the portion of the apparatus toward which the arrow points is referred to as the operation front side. On the operation front side, there is disposed an original document stacking tray 19 that projects from the operation front side. Furthermore, on the operation front side, there is disposed an original document insertion inlet 21 for inserting original documents into the apparatus. On the forward end side of the original document stacking tray 19 within the apparatus, there are disposed a pair of original insertion rollers 22. Furthermore, downstream of the pair of rollers 22, there are disposed a pair of paper feed rollers 23 and a pair of paper discharge rollers 24 in this order. As shown in FIG. 6, the lower roller of the original insertion rollers 22, the right side roller of the paper feed rollers 23 and the right side roller of the paper discharge rollers 24 are connected by an endless belt 25 through their respective pulleys 22a, 23a and 24a. By the rotation of a drive step motor 26 in the direction of the arrow, the above-mentioned rollers are rotated intermittently through a drive belt 27 and a large pulley 28, whereby the other rollers are driven at the same time.

Between the pair of original insertion rollers 22 and the pair of paper feed rollers 23, there are disposed curved original transportation guide plates 30 and 31, and between the pair of paper feed rollers 23 and the pair of paper discharge rollers 24, there are disposed an original document holding plate 32 and a contact glass 33 and a support plate 34 for supporting the contact glass 33. Furthermore, downstream of the pair of paper feed rollers 24, there is disposed an original document discharge tray 35 for guiding the original documents and for holding the original documents thereon.

(3) Recording Paper Transporation Apparatus System

Referring to FIG. 1, in the central portion of the present apparatus, there is disposed parallel to the guide shaft 4 a recording paper roll 20 in which an electrostatic recording sheet S is rolled. As shown in FIG. 3, the recording paper roll 20 is detachable from a holder shaft 39 supported by an immovable support bracket 40 and can be fixed to the holder shaft 39. In FIG. 1, there are disposed a curl correction roller 42 and a pair of main paper feed rollers 43 on the right side of the recording paper roll 20, respectively. The curl correction roller 42 and the pair of main paper feed rollers 43 constitute recording paper transporation means for transporting the recording paper S horizontally. Reference numerals 46 and 47 represent register rollers for use during development. Reference numeral 48 represents a heat application plate for image fixing and reference numeral 49 a heat application lamp for image fixing, respectively. Furthermore, reference numeral 51 represents an automatic sheet cutting apparatus having a rotary cutter 51a and a cutter 51b. On the right side of the apparatus 51, there are disposed a pair of recording paper discharge rollers 52.

Figure 7:
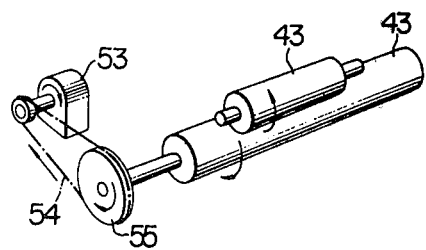
FIG. 7 is a schematic perspective view of one example of a recording paper transportation drive mechanism.

Referring to FIG. 7, the lower roller of the pair of main paper feed rollers 43 is driven intermittently in the direction of the arrow by a rotation drive apparatus comprising a step motor 53, a belt 54 and a large pulley 54. Furthermore, any one roller of the pair of recording paper discharge rollers 52 is likewise driven.

In the facsimile transmission and reception apparatus according to the present invention, the read scan and the record scan are conducted as follows. Each of the facsimile transmission and reception apparatus is provided with a read head and a record head so that both transmission and reception can be performed. When operating the present apparatus in practice, on each of the transmission side and reception side, one apparatus is set, so that read scanning is performed by use of only the read head on the transmission side, while record scanning is performed by use of only the record head on the reception side.

In practice, transmission and reception by using the facsimile apparatus are conducted as mentioned above. However, for convenience of explanation, both the read scanning and record scanning will be explained by use of one facsimile apparatus according to the present invention.

In the apparatus as shown in FIG. 1, an upper housing 2 having the recording paper transportation system and the heat application plate 48 for image fixing and the automatic recording paper cutting apparatus 51 can be opened about the shaft 17 at a slant opening position as shown in FIG. 2. At this position, the upper housing 2 is locked by an appropriate means. At the position shown, the recording paper S is pulled out from the recording paper roll 20 which has been mounted on the holder shaft 89 (refer to FIG. 3), so that the leading edge portion of the recording paper S is caused to be caught between the paper discharge rollers 52. When the recording paper roll 20 is mounted in the body of the apparatus 1, the upper housing 2 is opened by 90° or more from the position as shown in FIG. 1. In this case, an upper cover 15 for holding the discharged recording paper therein is rotated about a shaft 5a to open the cover 15.

After the leading edge portion of the recording paper S is caused to be caught between the paper discharge rollers 52, the housing 2 is closed by pivoting the housing 2 from the position as shown in FIG. 2 to the position as shown in FIG. 1. Thus, the apparatus is set ready for transmission or reception. Then, an original document 0 is stacked on the original document stacking tray 19 with the image information bearing side up and the original document 0 is inserted into the original document insertion inlet 21 with one side edge of the original document 0 in contact with a guide member 19a (refer to FIG. 3) of the original document stacking tray 19. Between the original document insertion rollers 22 and the original document stacking tray 19, there is disposed an original document position detecting sensor (not shown). When the sensor detects the leading edge of the original document, the step motor 26 shown in FIG. 6 begins to be rotated and at the same time, the original document insertion rollers 22, the paper feed rollers 23 and the paper discharge rollers 24 are rotated in the direction of the respective arrows. When the leading edge of the original document is caused to be caught between the original insertion rollers 22, the original is automatically transported into the apparatus.

The original 0 is transported by the rotation of the original insertion rollers 22 and is then caused to advance between the original transportation guide plates 30 and 31, which change the travelling direction of the original document so as to be almost normal to the inserting direction. The leading edge of the original document is then caught between the paper feed rollers 23. Another original document position detecting sensor (not shown) is disposed between original document guide members 29 which are disposed between a set of the original document holding plate 32 and the contact glass 33 and the pair of the paper feed rollers 23. When the original document is transported by a predetermined length after the leading edge of the original document has been detected by the original document position detecting sensor, the step motor 26 (refer to FIG. 6) is temporarily stopped and the paper feeding is stopped in this condition. Hereafter, an area indicated by symbol H between the original document holding plate 32 and the contact glass 33 will be referred to as an original document reading section. The step motor 26 is temporarily stopped when the leading edge portion of the original document is transported to the original document reading section. The original document 0 is continuously transported to the original document reading section, but when the original document 0 is subjected to read scanning, the original document 0 is transported intermittently as will be described in detail. The read scanning is ready when the leading edge of the original document comes to the original document reading section.

Figure 4:
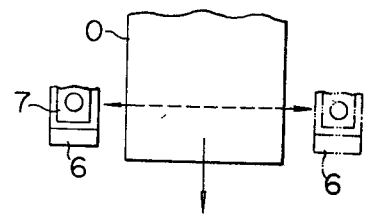
FIG. 4 shows the starting position and the final position of a read head for reading an original document.

When the read scanning is ready, the servomotor 13 shown in FIG. 3 begins to be rotated and at the same time, the carrier 6 is moved back and forth by the driving action of the wire 14. To be more specific, the carrier 6 is reciprocated between a starting position indicated by solid line and an end position indicated by imaginary line with respect to the original document 0 in FIG. 4 by the normal rotation and reverse rotation of the servomotor 13. With respect to the movement directions of the carrier 6, the movement direction of the original document 0 is defined as sub-scanning direction while the direction normal to the sub-scanning direction is defined as main scanning direction.

As mentioned previously, when the rotation of the servomotor 13 is started, the carrier 6 begins to be reciprocated. During the first forward movement of the carrier 6, the image information on the leading edge side of the original 0 positioned in the region indicated by the symbol H between the original document holding plate 32 and the contact glass 33 in FIG. 1 is read by the solid sensor 12 disposed within the read head 7 which is moved facing the image information. In other words, light from the original illumination lamp disposed at the front end portion of the head 7 passes through the contact glass 33 and is reflected on the original document surface. The thus reflected light passes through the lenses 10 and 11 and is projected on the solid sensor 12 as shown in FIG. 8.

Figure 8:
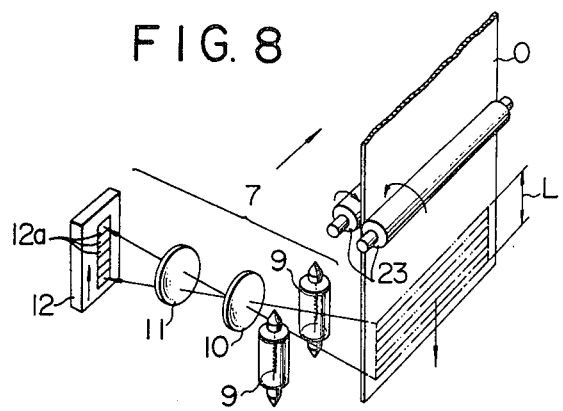
FIG. 8 is a schematic perspective view of a read scanning section for showing an original read scanning system.

In FIG. 8, the solid sensor 12 comprises read elements aligned in one direction, that is, in sub-scanning direction, such as an array of multiple photodiode elements, having a self-scanning function as is well known. Therefore, scanning of a plurality of lines corresponding to the number of photodiode array 12a can be performed by one scanning at a time by moving the read head in the main scanning direction while performing the self-scanning in the sub-scanning direction which is the moving direction of the original document 0. For example, when the photodiode array consists of 64 elements, the scanning for 64 lines can be performed at the same time. In the case where the scanning line density is set at 8 lines/mm, the read width L for the 64 lines is about 8.3 mm.

Referring to FIG. 1, the image information in the leading edge portion of the original document 0 is read by the solid sensor 12 during the forward movement of the read head 7 in the original read section indicated by symbol H, and when the head 7 is then returned to its start position, the step motor 26 shown in FIG. 6 is again energized. Therefore, after the original document insertion rollers 22, the paper feed rollers 23, and the paper discharge rollers 24 begin to be rotated, the original document 0, with its leading edge caught by the paper discharge rollers 24, is transported from the upper portion to the lower portion. In this case, the original document is transported intermittently in the direction of the sub-scanning direction by the transportation distance L (refer to FIG. 8) by the intermittent rotating drive of the step motor 26 (refer to FIG. 6). And with each completion of one reciprocating movement of the read head 7, the original document is transported intermittently by the paper discharge rollers 24, so that the image information is read continuously from the leading edge side of the original document to the rear edge side thereof. Thereafter, when the rear edge of the original document is detected by the original document position detecting sensor disposed at the guide member 29 and the original document is transported by a predetermined distance from the position, with the image information in the rear edge portion of the original document read, the carrier 6 is returned to its start position, so that the read scanning is completed.

However, the original document 0 is still transported by the paper discharge rollers 24, with its travelling direction changed to the operation front side of the present apparatus by the guide action of the original discharge tray 35, and is then discharged and held on the original document discharge tray 35. The original document 0 is discharged on the discharge tray 35 with the image information side position reversed with respect to its position in the tray 19, so that in the tray 35 the image information side faces down. Therefore, in the case where images of a stack of documents are transmitted successively, the original documents are stacked on the discharge tray 35 in the order of transmission with their image information bearing sides down. This causes the original documents to be stacked in the order of pages and it is unnecessary to change the order of the original documents to get them back in the order of pages at this stage.

As mentioned previously, the solid sensor 12 is disposed inside the read head 7, and with the movement of the read head 7, the images of the original document are successively read dot-like in the main scanning direction by the photodiode array, so that the read image information is successively converted into the image signal. In this case, when the original image is successively read dot-like, the read scanning pitch in the main scanning direction can be set in many ways. In general, this is represented in terms of line density, for example, 8 lines/mm. In the present facsimile transmission and reception apparatus, the following system is adopted in order to set such scanning pitches.

To be more specific, referring to FIG. 1, in a detecting member 57 fixed to a lower portion of the read head 7, a light source 58, such as a lamp and a light emitting diode, and a photosensor 59, which constitutes a counterpart of the light sources 58, so that both face each other. Above these members, there are likewise disposed a light source 60 and a photosensor 61 which is the counterpart of the light source 60. These two sets of the detecting devices perform the function of the so-called photocoupler.

Figure 5:
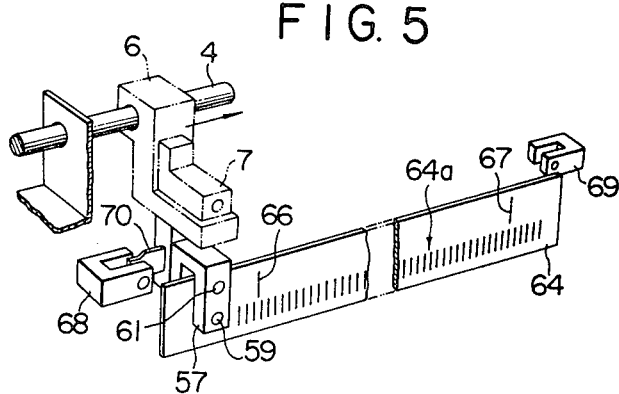
FIG. 5 is a schematic perspective view of an apparatus for setting scanning pitch at the time of reading and recording.

On the other hand, between these detecting devices, there is disposed a slit pattern 64 made of a film of etching plate or the like in the main scanning direction and fixed to the body of the present apparatus by an attachment member 65. As shown in FIG. 5, in the slit pattern 64, there are formed a number of slits spaced n times the pitch of the line density in the main scanning direction at the time of reading, where $n \geq 1$. In the case where the line density in the main scanning direction is 8 lines/mm, for example, the slit pitch is 0.125 mm and the slits are equally spaced and distributed in all the range corresponding to the movement range of the carrier 6.

Referring to FIG. 5, as the carrier 6 is moved in the main scanning direction which is indicated by the arrow, the read head 7 and the detection member 57 are moved integrally with the carrier 6 in the same direction. At this moment, slit marks 64a of the slit pattern 64 are successively read by the photocoupler comprising the light source 58 (refer to FIG. 1) and the photosensor 59 disposed under the detection member 57. The successive signal having a predetermined period or the so-called clock pulses, obtained by the above-mentioned reading, are applied in order of time to the solid sensor 12 of the read head 7 in the form of drive pulses through a control circuit (not shown), so that reading in the main scanning direction is conducted. In other words, the reading position of each image element at the time of transmission is determined by the pitch corresponding to the above-mentioned signals. That is, the scanning pitch in the main scanning direction is determined by the slit pattern. At the same time, the recording pitch at the time of recording can be also determined by the slit pattern.

Since the scanning pitch is determined by the slit pattern for use in reading and recording at the time of reading and recording, even if the speed of the carrier 6 is changed somewhat, the respective reading positions and recording positions are always constant. Accordingly, deviation of image does not occur, so that copies of excellent image quality can be obtained.

As shown in FIG. 5, by placing a start mark 66 and an end mark 67 in an upper portion of the slit marks 64a, the timing of reading and that of scanning start and scanning completion at the time of recording can be determined. To be more specific, when the carrier 6 is moved from the start position shown in FIG. 5 in the direction of the main scanning, the start mark 66 is read by the photocoupler comprising an upper light source 60 (refer to FIG. 1) and the photosensor 61 of the detecting member 57, which is moved together with the carrier 6, so that the read scanning and record scanning are started. Furthermore, when the photocoupler reads the end mark 67, both the read scanning and the record scanning are completed.

Referring to FIG. 5, reference numeral 68 represents a photocoupler for detecting the start position of the carrier 6, and reference numeral 69 a photocoupler for detecting the end position of the carrier 6. Furthermore, reference numeral 70 represents a shutter plate fixed to the side of the carrier 6. The start position of the carrier 6 is determined by switching actuation which is performed by closing and opening of the light path inside the photocoupler 68. On the other side, there is disposed a similar shutter (not shown). By the shutter in combination with the photocoupler 69 for detecting the end position, the end position of the carrier 6 is likewise set. By adopting such system, unexpected accidents, such as runaway of the carrier 6, which may be caused for some reason, can be prevented.

The recording scanning system of the present invention will now be explained. Referring to FIG. 1, the recording paper S is the conventional rolled electrostatic recording paper. First, the recording paper S is pulled out from the recording paper roll 20 and the leading edge of the recording paper is caused to be caught manually between the discharge rollers 52 as shown in FIG. 2. From the position as shown in FIG. 2, the upper housing 2 is closed to the position as shown in FIG. 1. At this moment, the recording paper slacks due to the offset distance of the fulcrum (shaft 17) of the housing 2 from the center of the recording paper roll 20 or for some other reasons. However, such slacking of the recording paper can be absorbed in the set portion of the recording paper roll, so that the recording paper is maintained in tension.

Referring to FIG. 1, as the present apparatus begins to be operated, the carrier 6 also begins to move forwards in the main scanning direction and the pair of the main feed rollers 43 are also rotated by the driving action of a step motor 53 (refer to FIG. 7). Furthermore, the recording paper discharge rollers 52 begin to be rotated by another drive motor, whereby the recording paper S is drawn out from the recording paper roll 20 and is transported in the sub-scanning direction which is normal to the movement direction of the carrier 6. At this moment, the upper portion of the record head 8 is moved in contact with the surface of the recording paper, namely the surface to be recorded. By this movement, the surface of the recording paper in contact with the record head 8 is electrically charged for recording.

Figure 9:
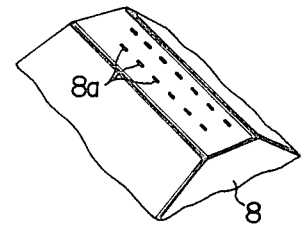
FIG. 9 is a schematic perspective view of an upper portion of the record head.

The recording head 8 has recording styli, such as electrode styli 8a, whose end portions are bare, in the upper portion of the head 8, and the styli are arranged in one or two rows in the sub-scanning direction as shown in FIG. 9. The number of the electrode styli is the same as that of the photodiode arrays 12a of the solid sensor 12 (refer to FIG. 8). Therefore, with one recording scan of the record head 8, record charging is performed in the width equal to the read width L (refer to FIG. 8) at the time of reading. The recording paper is transported intermittently by the step motor 53 (refer to FIG. 7).

The recording surface of the recording paper S is brought into contact with the upper portion of the record head 8 by means of the recording paper holding member 44, and the record head 8 is moved in the main scanning direction. At the same time, a dot-like electrostatic charging is successively applied on the surface of the recording paper for forming a latent electrostatic image thereon by a signal voltage application means which grounds the backside of the recording paper, without employing a signal voltage application means by use of discharging between the electrode styli 8a and auxiliary electrodes (not shown) or without employing the auxiliary electrodes. The latent electrostatic image is developed to a visible toner image by a dry type development apparatus comprising a magnet roller 72, a fixed sleeve 73, and a development tray 74.

The toner image is thermally fixed to the recording paper S while the recording paper S is passing between the heat application plate 48 and the lamp 49 for thermal image fixing. The lamp 49 is designed so as to be turned on and off in order to prevent the overheat of the lamp. The heat application plate 48 is controlled with respect to the temperature thereof for uniform image fixing and safety. The safety of the heat application plate 48 is further secured by use of a temperature fuse. After image fixing, the recording paper S is cut in a length almost equal to that of the original document by the automatic recording paper cutting apparatus 51 and is then discharged onto the upper cover 15 capable of holding the recording paper thereon. Cutting of the recording paper can be performed manually by use of a fixed type cutter, without using the automatic recording paper cutting apparatus.

Referring back to FIG. 1, the recording paper S is transported intermittently during the recording scan by the intermittent rotation of the main feed rollers 43 and the discharge rollers 52. However, after completion of charging of the final portion of the recording surface of the recording paper, the recording paper S is continuously transported until the final portion of the recording paper passes through the automatic recording paper cutting apparatus 51. Furthermore, between the curl correction roller 42 and the read head 8, there is disposed a recording paper final end detecting sensor 76, which detects the final end of the recording paper roll 20. When the final end of the recording paper roll 20 is detected, the recording scan is stopped immediately.

Referring to FIG. 1, a brake member 41 is fixed to the side of the upper housing 2. The brake member 41 is designed so as to be brought into pressure contact with the peripheral surface of a flange 39a of the holder shaft 39 (refer to FIG. 3) when the housing 2 is closed in the position as shown in FIG. 1. Therefore, the recording paper roll 20 is rotated under the braking action of the brake member 41 and a back tension is applied to the recording paper, so that the recording paper does not slack and the recording scan is performed with high accuracy by the head 8. At the same time, the recording paper is uniformly brought into pressure contact with the upper portion of the head 8 with an appropriate contact pressure by the gravity of a free end of the recording paper holding member 44, so that recording scan can be performed with a high accuracy. Furthermore, an elastic member is attached to a portion of the holding member 44 with which the recording paper is in contact, whereby the above-mentioned contact pressure is kept constant and abrasion of the upper portion of the head 8 is prevented.

Rotation driving force is applied to the main feed rollers 43 and the recording paper discharge rollers 52, respectively. However, the feeding of the recording paper is substantially performed by the main feed rollers. To be more specific, in the friction between the respective facing rollers of the main feed rollers 43 and of the discharge rollers 52 and the rotation distances of those rollers, there is the following relationship. The friction of the discharge rollers 52 is smaller than that of the main feed rollers 43, and the rotation distance of the discharge rollers 52 is greater than that of the main feed rollers 43. Therefore, the discharge rollers 52 are rotated with a slippage corresponding to the difference of the rotation distance between the main feed rollers 43 and the discharge rollers 52 and the transportation of the recording paper is substantially performed by the main feed rollers 43. The upper roller of the main feed rollers 43 is shorter than the lower roller disposed on the drive side as shown in FIG. 7 and serves to prevent the skew of the recording paper. The curl correction roller 42 is for setting the position of the recording paper relative to the record head 8 in collaboration with the main feed rollers 43. Instead of the curl correction roller 42, a guide plate with a comparatively small coefficient of friction can be used. The roller on the drive side of the discharge rollers 52 is provided with a one-way clutch, which serves to make it possible to rotate the discharge rollers manually when the leading edge of the recording paper is caught by the discharge rollers and to prevent the discharge rollers from rotating in the opposite direction in order to prevent slacking of the recording paper.

Referring to FIG. 1, a high voltage drive circuit for recording is installed in a unit 77 fixed to the carrier 6. In an electrical device unit 78 on the left side of the present apparatus in FIG. 1, there are disposed printed boards comprising circuits for coding and compressing information and modulation circuits for transmitting data to a telephone line. The electrical device unit 78 can be pulled out in the upper direction by opening the upper cover 15. Furthermore, reference numeral 80 in FIG. 1 represents a bundle of lead wires for use with the solid sensor 12 and the record head 8 or with the original document illumination lamp 9. The bundle of the wires are led from the carrier 6 and have enough slack so that the carrier 6 can move back and forth freely. The bundle of lead wires 80 is inserted into a vinyl tube or the like, and around the vinyl tube, there is a coil spring, so that the abrasion or damage or disconnection of the lead wires is prevented by use of the flexibility of the coil spring.

Figure 10:
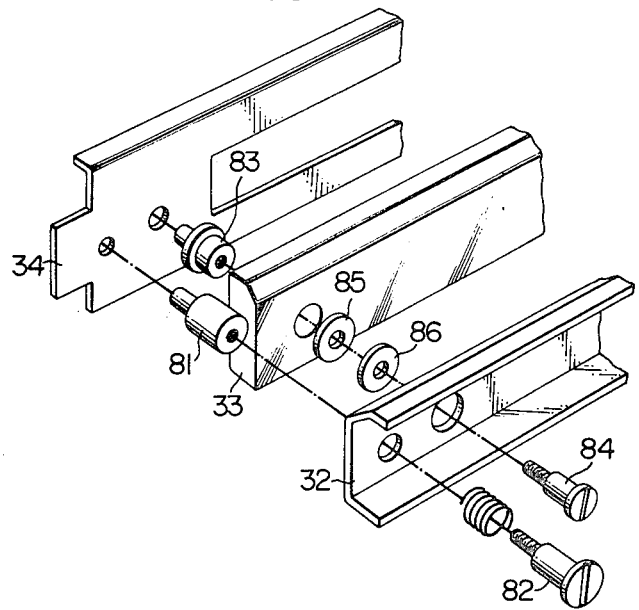
FIG. 10 is a schematic exploded perspective view of the attachment arrangement of a contact glass and an original document holding plate and a support plate in the original document reading section.

In the apparatus of the present invention, a unit body 3 on the original transportation side can be opened by rotation about the shaft 18 as shown in FIG. 2, so that removal of the jammed originals which may occur in the original document transportation path and the cleaning of the contact glass 33 can be easily performed. As shown in FIG. 12, instead of such an opening and closing system as the above-mentioned unit body, one guide plate 30, shaped as in FIG. 12, of the original transportation guide plates 30 and 31 can be used by designing it so as to be capable of opening and closing. Furthermore, at the same time, the original document holding plate 32, designed so as to be detachable, can be used. To be more specific, referring to FIGS. 10 and 11, the original document holding plate 32 is mounted on the support plate 34 fixed to the body of the present apparatus, by use of attachment screw 82 through a spacer 81, whereby the original document holding plate 32 can be easily detached by removing the screw 82. The spacer 81 is caulked to the support plate 34. The contact glass 33 is attached to the support plate 34 by attachment screw 84 through a spacer 83. Reference numerals 85 and 86 represent spacer linings. The clearance between the contact glass 33 and the original holding plate 32 is set in the range of 0.7 mm to 0.8 mm.

On the other hand, in the present apparatus, the upper housing 2 can be opened as shown in FIG. 2, so that the recording paper transportation path can be opened and jammed recording paper can be corrected. The upper housing 2 can be opened by 90° or more, so that loading of the recording paper roll and adjustment and maintenance of the present apparatus and replenishment of toner can be performed easily. All of the work of this sort and removal of the jammed original documents can be performed from the front side of the present apparatus, which is indicated by the arrow in FIG. 1. Furthermore, in the present apparatus, the recording paper S is discharged onto the upper cover 15 with the recorded information image face-up, which makes the user feel that the reception is being conducted in reality while operating the apparatus.

Furthermore, in the present apparatus, the original document transportation mechanism and the recording paper transportation mechanism are arranged so that the original document 0 and the recording paper S are positioned in the almost the same width range normal to the advancing direction of the original document 0 and the recording paper S as shown in FIG. 3. Therefore, in view of the arrow B in FIG. 3, the above-mentioned two mechanisms are positioned in the same width range, so that the width of the apparatus can be made smaller and accordingly the whole size of the apparatus can be reduced. In particular, in comparison with an apparatus in which the original document transportation mechanism and the recording paper transportation mechanism are respectively disposed horizontally in the opposite directions in view of the arrow B, the present apparatus can be significantly reduced in size.

What is claimed is:

1. Facsimile apparatus comprising:
    an insertion inlet through which to insert original documents into said apparatus, each of said documents having an image information side and being inserted into said insertion inlet with said image information side facing up;
    collection means lower than said inlet to accumulate said original documents;
    channel means comprising a channel to direct the original documents from said inlet to said collection means and to cause said original documents to stack up at said collection means in the same order in which they were inserted into said insertion inlet and with the image information side facing down;
    transducing means comprising photosensitive means and optical means to produce, on said photosensitive means, an optical image of a predetermined object area of a portion of said channel means;
    carrier means for transporting said transducing means in a main scanning direction to scan said object area across a predertmined part of said channel; and
    transportation means to transport each of said original documents in a controlled manner along a sub-scanning direction past said predetermined part of said channel and with the image information side facing in a direction to have an image thereof focused by said optical means on said photosensitive means.

2. The invention as defined in claim 1 in which said facsimile apparatus comprises a front side, and both said insertion inlet and said collection means are located in said front side.

3. The invention as defined in claim 2 in which said channel means comprises a plurality of curved plates and said transportation means comprises a plurality of rollers to pull each of said original documents through said channel, one at a time, one of said plates adjacent said front side being pivoted on an axle, with one of said rollers, said plate being pivotal toward said front side to open a portion of said channel to allow extraction therefrom of jammed original documents.

4. The invention as defined in claim 1 in which said channel means comprises a plurality of curved plates defining a generally C-shaped channel, said transportation means comprising a drive motor and roller means connected thereto, said roller means comprising a pair of rollers located on opposite sides of said channel to press against each of said original documents in succession and draw it along said channel, said facsimile apparatus further comprising a pivotally mounted support for at least one of said rollers and at least one of said plates facing said front side, said support being pivotal toward said front side to open said channel to remove original documents that become jammed therein.

5. The invention as defined in claim 1 comprising, in addition, sensing means to sense the presence of one of said original documents at a pre-determined location in said channel and to actuate said transportation means to transport the sensed document farther along said channel.

6. The invention as defined in claim 5 further comprising means to actuate said transportation means in a series of steps, each of said steps being such as to move into said object area a portion of said information side adjacent a previously-scanned section of said image side.

7. The invention as defined in claim 1 in which said photosensitive means is divided into a plurality of elemental areas in said sub-scanning direction.

8. The invention as defined in claim 7 in which said photosensitive means are of elemental widths in the main scanning direction, whereby scanning is esentially accomplished by a plurality of dots.

9. The invention as defined in claim 1 comprising:
    a source of recording paper in said apparatus;
    electrical transfer means;
    recording paper transport means to transport said paper past said electric transfer means; and
    means connecting said photosensitive means to said transfer means to actuate said transfer means to record on said recording paper information corresponding to an image of said image information side of each of said original documents in sequence.

10. The invention as defined in claim 9 in which the width of said recording paper is approximately equal to the width of said object area in said main scanning direction.

11. The invention as defined in claim 9 in which said electric transfer means is mounted on said carrier means to be transported thereby simultaneously with the transporting of said transducing means in said main scanning direction.

12. The invention as defined in claim 9 in which said electric transfer means comprises a plurality of transfer devices of elemental cross sectional area to record said information on said recording paper in dot form.

13. The invention as defined in claim 12 in sensitive means comprises a pre-determined number of elemental dot areas located side by side in a row parallel to said sub-scanning direction, and said electric transfer means comprises the same number of dot recording means as the number of said photosensitive means, the dot means of said electric transfer means being arranged to apply to said recording paper groups of dots spaced with respect to each other in the same manner as groups of elemental areas of said optical image received by said photosensitive means.

14. The invention as defined in claim 9 comprising, in addition, means to detect the presence of said recording paper at a pre-determined location and to control said recording paper transportation means.

* * * * *